J. A. BASSETT.
Making Oil and Water Gas.
No. 26,644.
Patented Jan. 3, 1860.
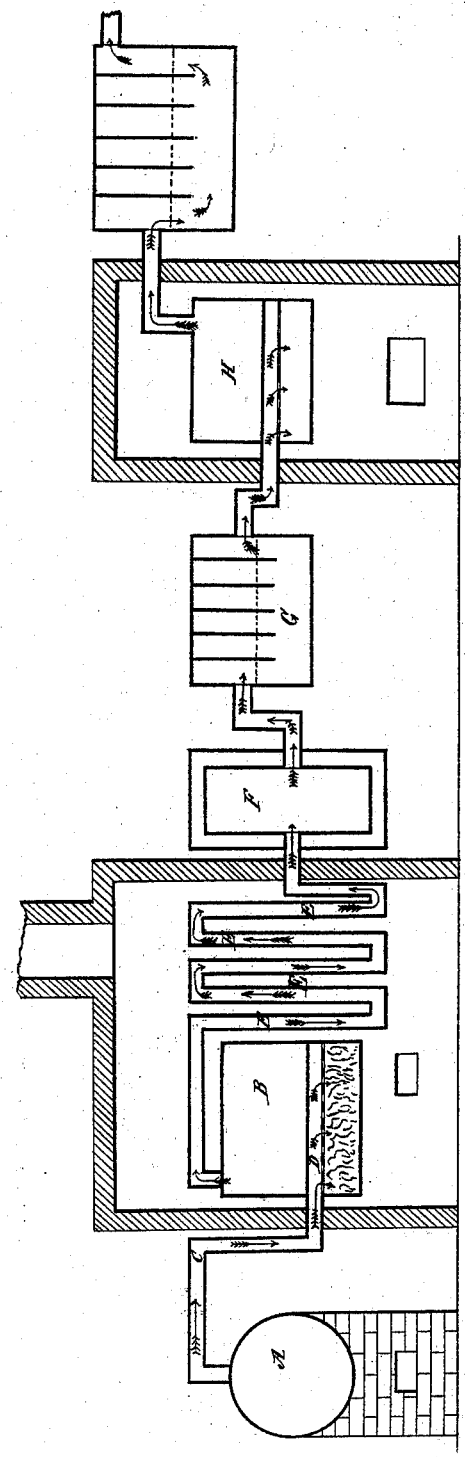
Witnesses:
A. Moore
G. A. C. Smith
Inventor:
John A. Bassett

UNITED STATES PATENT OFFICE.

JOHN A. BASSETT, OF SALEM, MASSACHUSETTS.

MANUFACTURE OF HYDROCARBON GAS.

Specification of Letters Patent No. 26,644, dated January 3, 1860.

*To all whom it may concern:*

Be it known that I, JOHN A. BASSETT, of Salem, in the county of Essex, State of Massachusetts, have invented a new and useful Improvement in the Manufacture of Illuminating-Gas; and I do declare the following to be a full, clear, and exact description of the same, reference being had to the accompanying drawing, making a part of this specification, which represents in section an apparatus by which the invention can be practically carried out, as will be explained.

The nature of my invention consists in the making of an illuminating gas from hydrogen and the vapor of a liquid hydrocarbon, by a continuous process as is herein described.

To enable my invention to be practically carried out and used, I will proceed to describe the same.

Reference being had to the accompanying drawing forming a part of this specification, A is a boiler made in the usual manner and to which heat is applied for the purpose of making steam, and from which the steam passes to the retort B by the pipe C, passing through the perforated pipe D set near the bottom of the retort, which is intensely heated, and which partially converts the steam into hydrogen—the retort I have filled with coke, pumice stone, charcoal or any substance calculated to increase the heated surface of the retort, and prevent its being rapidly oxidized. From this retort the gas passes through the pipes E set in the same furnace or otherwise exposed to the same heat as the retort, in order to effect the more perfect decomposition of the steam. From these pipes the gas passes through the condenser F by which it is cooled and the condensable portions condensed. The condenser shown consists of two cylinders one being within and smaller than the other. Water is admitted between, which rapidly cools the gas. The gas passes from the condenser into the carbonizing chamber G which is kept a little more than half full of the liquid hydrocarbon and is provided with a number of partitions under which the gas passes through the liquid hydrocarbon. The temperature of this chamber is always low, and the liquid hydrocarbon is used cold. From this chamber the mingled hydrogen and vapor of the liquid hydrocarbon passes into the retort H which is kept at the same intense heat as the first retort used, where it is converted into a permanent illuminating gas. The gas then passes into the purifier I which is constructed in the same manner as the carbonizing chamber, and being two thirds full of water the gas passes under the partitions and through the water into the gasometer ready for use.

I believe the form of the retort to be new and best adapted to the production of hydrogen from steam.

I pass the steam from the boiler as fast as it will pass under the partitions in the carbonizing chamber, without creating too great a pressure and causing it to rush through in too great a volume. I prefer to keep the water low in the boiler, or to use a steam dome to have the steam perfectly dry.

Having thus fully described the nature of my invention what I claim therein as new, and desire to secure by Letters Patent, is—

The continuous manufacture of an illuminating gas, by carrying the hydrogen and the vapor of a liquid hydrocarbon formed in the manner herein described through a retort which is intensely heated, for the purpose of producing a permanent illuminating gas.

JOHN A. BASSETT.

Witnesses:
  S. W. JONES,
  P. M. NICKLE.